United States Patent [19]

Freeman et al.

[11] Patent Number: 5,428,608
[45] Date of Patent: Jun. 27, 1995

[54] CALL CONNECTION TECHNIQUE

[75] Inventors: Brian D. Freeman, Howell; Bruce L. Hanson, Little Silver, both of N.J.; Mark M. Rochkind, Greenwich, Conn.; Lee B. Strahs, Oceanport, N.J.

[73] Assignee: AT&T Corp., Murray Hill, N.J.

[21] Appl. No.: 176,004

[22] Filed: Dec. 30, 1993

[51] Int. Cl.$^6$ ............................................. H04L 12/64
[52] U.S. Cl. ....................... 370/60.1; 370/62; 370/94.1; 370/60; 375/222; 379/90; 379/93; 379/94
[58] Field of Search ............... 370/60, 60.1, 62, 94.1, 370/94.2, 110.1; 375/7, 8; 379/201, 90, 93, 94

[56] References Cited

U.S. PATENT DOCUMENTS

| | | | |
|---|---|---|---|
| 4,589,107 | 5/1986 | Middleton et al. | 370/62 |
| 5,093,827 | 3/1992 | Franklin et al. | 370/60.1 |
| 5,214,650 | 5/1993 | Renner et al. | 370/110.1 |
| 5,283,819 | 2/1994 | Glick et al. | 379/90 |
| 5,325,423 | 6/1994 | Lewis | 379/90 |

*Primary Examiner*—Douglas W. Olms
*Assistant Examiner*—Russell W. Blum
*Attorney, Agent, or Firm*—Eugene J. Rosenthal

[57] ABSTRACT

In an environment in which simultaneous voice/data (SVD) modems are provisioned in the public switched network for separating and separately routing voice and data calls from users having SVD modems, at least one user who is already employing a first connection through an SVD modem provisioned in the public switched network, for interacting with a remote destination over one of the two channels provided by an SVD modem, may have a second connection, over the second of the two channels provided by an SVD modem, automatically established for him. The second connection may be established in response to a request by one of the users. In a particular embodiment of the invention, the data channels supplied from each SVD modem of each of said users are routed to a common data application, e.g., a game, and a direct connection is established between the voice channels of the SVD modems in response to a command from the data application in response to the request of one of the users. Such a feature is called "voice assist" or, in the gaming context, "talk and play". A similar "data assist" feature can to automatically establish a data connection between users who are interacting with a common application over their voice channels. A context-sensitive voice assist feature is also provided to automatically establish a voice connection between a user of an application and an appropriate person, given the context in which the user requests the voice connection.

23 Claims, 6 Drawing Sheets

| CUSTOMER NAME | LOGIN | PASS WORD | PHONE NUMBER | BILLING NUMBER | STATE | SVD MODEM POOL | CALL WAITING D | CALL WAITING V | SVD MODEM | ALT MODEM POOL |
|---|---|---|---|---|---|---|---|---|---|---|
| L. STRAHS | STRA | XYZ1 | 908-555-1234 | 908-555-1234 | VA | 908-555-1000 | N | Y | 1 | |
| B. FREEMAN | FREE | ABC1 | 212-555-2345 | 212-555-2345 | DA | 212-555-1000 | Y | Y | 0 | |
| B. HANSON | HANS1 | RTR1 | 700-555-9283 | 700-555-2395 | NC | 212-555-1000 | N | Y | 1 | |
| E. ROSEN | EJR7 | LTR9 | 700-555-3844 | 700-555-7722 | VD | 212-555-1000 | Y | Y | 14 | 905-555-1000 |
| M. ROCHKIND | MARK | PO13 | 908-555-8373 | 908-555-8373 | VD | 908-555-1000 | N | N | 5 | |

CALL CONNECTION TECHNIQUE

TECHNICAL FIELD

This invention relates to providing simultaneous voice and data communications using simultaneous voice and data modems.

BACKGROUND OF THE INVENTION

People often need to establish voice and data communications with separate destinations at the same time. Prior art methods for obtaining such voice and data communication services include employing (a) Integrated Services Digital Network (ISDN) technology, which is an all digital technology that provides a user with two separate bearer (B) channels, each of which independently and simultaneously carries user information, so that one channel may carry voice while the other channel carries data; b) multiple "plain old telephone service" (POTS) lines; and c) data over voice modems, which carry a full POTS channel and a full data channel on a carrier frequency well above the highest POTS-channel frequency.

ISDN 1) is expensive to implement, 2) is not universally available, and 3) must be provisioned by the local exchange carrier (LEC). Multiple POTS lines are expensive and cumbersome to deal with. Each data over voice modem requires a) a dedicated modem in the central office, b) special conditioning of the local loop to the central office, and c) a limit on the loop length connecting the data over voice modem to the central office. These limitations arise because data over voice modems require additional bandwidth substantially beyond that which is available over a single POTS connection. In addition to the above-noted disadvantages, all the foregoing technologies must be provisioned for use ahead of time, resulting in their being inflexible and lacking portability. As a result, ISDN and data over voice service are not widely available.

Another prior art technology for providing a user with simultaneous voice and data communication service is employed in SVD modems. SVD modems are modems for use in providing simultaneous voice and data service within the bandwidth provided by a single POTS connection, i.e., a bandwidth of approximately 3200 hertz. Present SVD modems typically can provide a telephone quality voice channel and a data channel of up to 4800 bits per second simultaneously. Should the data channel not be in use, the quality of the voice channel is increased slightly. Similarly, if the voice channel is not in use, the speed of the data channel can be increased to 14.4 Kbits per second. (For a detailed description of exemplary technology used in SVD modems see patent application Ser. No. 08/076,505 filed Jun. 14, 1993 and assigned to the same assignee as the present invention.) One exemplary, commercially available SVD modem is the AT&T DataPort ® 2001 modem. It is anticipated that future SVD modems will be more efficient, permitting an even higher rate of data transmission while the voice channel is in use.

Because SVD modems communicate over a single POTS channel, they can be attached to the large number of POTS subscriber telephone lines without any advanced provisioning. However, at present, SVD modems can only be used to provide point-to-point simultaneous voice and data service where the parties at each end of the POTS connection have an SVD modem, thereby limiting their usefulness.

In concurrently filed application Ser. No. 08/176,002 it is recognized that an improvement in providing simultaneous voice and data communications can be achieved by provisioning within the public switched telephone network one or more SVD modems that (a) can communicate with SVD modems of the network users over a single "plain old telephone service" (POTS) connection, and (b) can separate, and deliver to different destinations the voice and data channels received from an SVD modem. In order to deliver the received voice and data channels to different destinations, the voice and data channels may be routed separately and independently through the public switched telephone network. The SVD modems in the public switched telephone network can also combine voice and data traffic from separate sources for transmission together over a single POTS connection to a user's SVD modem.

In one exemplary system, an inter-exchange carrier (IXC), e.g., AT&T, provides a plurality of SVD modems arranged as a "modem pool". Callers may access the SVD modems of the pool, which constitutes a shared network resource, to obtain simultaneous voice and data service. To access the SVD modems of the pool, special dialing codes and an optional login procedure are employed. The voice and data channels of an SVD call from a caller are separated at the network side of the SVD modem pool, so that they may be routed to different destinations. After separation, the voice channel of the call is routed over the IXC's circuit switched network and the data channel of the call is carried over a packet network. The voice channel of the call (a) may be routed in the usual manner, e.g., (1) through a LEC, to a voiceband device, such as a telephone, answering machine, facsimile (fax) machine, or conventional modem, or (2) to a network based voiceband audio service; or (b) it may be routed to an SVD modem pool for possible combination with a data channel for delivery to an end-point subscriber who has an SVD modem. The data channel of the call may be routed over the packet network to (a) a host directly connected to the packet network, (b) a modem pool having conventional data only modems, or (c) an SVD modem pool for possible combination with a voice channel for delivery to the end-point subscriber who has an SVD modem.

A user whose SVD modem is connected to an SVD modem in the public switched network and who is not using both the voice and data channels provided by the SVD modem, may originate or receive calls on the unused channel.

SUMMARY OF THE INVENTION

We have recognized that the availability of such a modem pool can be useful in providing advanced features to users. In accordance with the principles of the invention, at least one user who is already employing a first connection through an SVD modem provisioned in the public switched network, for interacting with a remote destination using a first one of the two channels provided by an SVD modem, may have automatically established for him a second connection, using the second one of the two channels provided by an SVD modem. In the context of this invention, "automatically" means without the user having to explicitly supply a destination address, e.g., a telephone number. The second connection may be established in response to a request by the at least one user.

In accordance with an aspect of the invention, users who are each employing an SVD modem provisioned in the public switched network for interacting with each other over a first connection, the first connection being via a particular path between the users' SVD modems in the public switched network that carries one of the two channels provided by an SVD modem, have a second connection automatically established between them, the second connection being via a path between the users' SVD modems in the public switched network that is independent of the path carrying the first channel therebetween and using the second channel provided by an SVD modem. In a particular embodiment of the invention, the public switched telephone network can connect together the voice channels of users with SVD modems, without either user having to dial the voice extension of the other, based on the existence of a connection between the data channels of the users. The data channels supplied from each SVD modem of each of said users are routed to a common data application, and a direct connection is established between the voice channels of the SVD modems in response to a command from the data application. The voice connection is initiated in response to the request of one of the users. Such a feature is advantageous to users who are using their data channels to both a) engage in the same application and b) interact with each other, e.g., they are playing a game, by letting them easily add voice communication with each other over their voice channels, with neither needing to know the destination address, e.g., telephone number, of the other that would otherwise be necessary to establish such a link over the voice channel. Such a feature is called "voice assist" or, in the gaming context, "talk and play".

A "receive caller screening" option is also provided. The receive caller screening option is a feature which allows a non-requesting user to accept or refuse a requested voice connection even before it is routed. This is important when the receipt of a call will cause the receiving user to incur a charge.

A similar "data assist" feature may also be implemented, by which a data connection is automatically established between users who are interacting with a common application over their voice channels. Such a feature is especially advantageous in an education paradigm for use by students in collaborating on a homework assignment.

In accordance with another aspect of the invention, a user who is employing an SVD modem provisioned in the public switched network for interacting with an application over a first connection using only one of the two channels provided by an SVD modem, the application having multiple contexts in each of which, for example, different commands, features, functions, information, or services may be provided, has a second connection automatically established, at his request, to a particular person. One particular person is determined at least as a function of the context in which the application is being used by the user at the time his request is made. The second connection is also via the user's SVD modem in the public switched network and it carries the second SVD modem channel. The user need know neither the identity of the particular person nor his telephone number.

In a particular embodiment of the invention, a user, who wishes to make a purchase, is interacting with a data application, such as an on-line home shopping system, via a data connection through the user's SVD modem and an SVD modem in the public switched network. In considering whether or not to purchase a particular product, the user, for example, reviews a copy of an extended warranty for that product. The phraseology of the warranty, however, is such that the user, by simply reading it, cannot clearly discern what is covered by the warranty. He therefore requires assistance, which is best provided by speaking with a representative of company supplying the warranty. To get help, the user enters a command, e.g., by typing on his keyboard or by clicking his mouse over a predefined on-screen "button", indicating that assistance by a live representative is required. The on-line home shopping system recognizes the command and, determines from the context, i.e., the activity of the application that the user is currently engaged in, namely viewing a particular product's extended warranty, that the best person for the user to speak with is a representative of the company supplying the warranty. Therefore, the application transmits over the data channel a special message containing the destination address, e.g., telephone number, of a representative of the company supplying the warranty. This message is intercepted by a platform connected to the SVD modems in the public switched network that provides SVD service features. The platform causes a voice channel connection to be established from the user to a representative of the company supplying the warranty. Such a feature is called "context-sensitive voice assist".

A similar "context-sensitive data assist" feature may also be implemented, by which a data connection is automatically established to a user who is interacting with an application using his voice channel. Such a feature is especially advantageous for the purpose of working with a claims processing agent, e.g., a health insurance claim processor, so that a user can see the data that is available to the agent.

DETAILED DESCRIPTION

Figure 1:
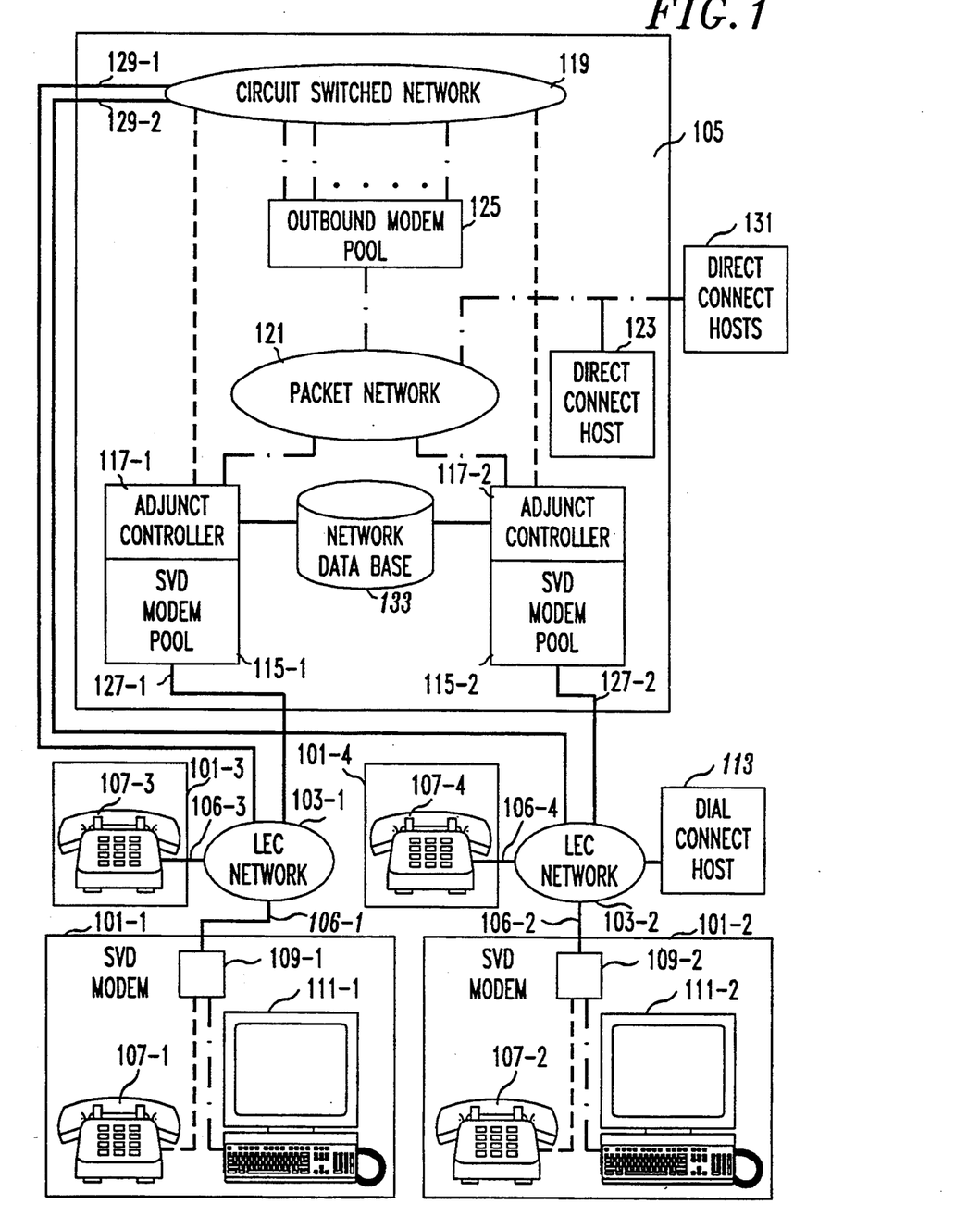
FIG. 1 shows the provisioning of SVD modems within the public switched telephone network for communicating with SVD modems of various subscribers.

In order to understand the invention, it is necessary to generally understand the provisioning and use of SVD modems in the public switched telephone network. To this end, FIG. 1 shows the provisioning of SVD modems within the public switched telephone network for communicating with SVD modems of various subscribers so that a) the voice and data channels output by the subscribers' SVD modems can be separated and separately routed and b) voice and data channels being transmitted to the subscribers' SVD modems can be combined from separate sources. The following key is used to help clarify the various types of communication links shown in FIGS. 1 and 2: a) a dashed line represents a link capable of carrying a voice only connection, b) a dashed-dot line represents a link capable of carrying a data only connection, and c) a solid line represents a link capable of carrying a full POTS channel. Control lines are also shown as solid lines.

FIG. 1 shows subscribers 101, designated 101-1 through 101-4; LEC networks 103, designated 103-1 and 103-2; and IXC network 105. Subscriber 101-1 has 1) a voiceband audio communications device, e.g., telephone 107-1, 2) a data communications device, e.g., terminal 111-1, and 3) SVD modem 109-1, connected to both telephone 107-1 and terminal 111-1. SVD modem 109-1 is also connected to LEC network 103-1 via POTS subscriber line 106-1, i.e., a standard analog local loop. Similarly, subscriber 101-2 has a) a voiceband communications device, e.g., telephone 107-2, b) a data communications device, e.g., terminal 111-2, and c) SVD modem 109-2, connected to both telephone 107-2 and terminal 111-2. SVD modem 109-2 is also connected to LEC network 103-2 via POTS subscriber line 106-2. Subscribers 101-3 and 101-4 each have only a single voiceband communications device, e.g., telephones 107-3 and 107-4, respectively. They are connected to LEC networks 103-1 and 103-2, respectively, by POTS subscriber line 106-3 and 106-4. Also connected to LEC network 103-2 is dial connected host 113, the function of which will be explained further below.

LEC networks 103 are connected to IXC network 105 by a) links 127, which directly connect LEC networks 103 to one of SVD modem pools 115, and b) links 129, which connect LEC networks 103 to circuit switched network 119.

In one implementation, in order to connect either a voice call or a data call via an SVD modem 109 a two-stage dialing procedure is necessary. In the first stage, the telephone number of a first SVD modem pool, e.g., SVD modem pool 115-1, is dialed by the caller, e.g., the subscriber. Such dialing is conventional telephone dialing. This causes a connection to be established from SVD modem 109-1 through LEC 103-1 to an SVD modem in SVD modem pool 115-1. LEC 103 knows that it is routing the call directly to SVD modem pool 115-1 based on the telephone number supplied in the first stage. Alternatively, a connection may be established to SVD modem pool 115-1 via link 129 through circuit switched network 119. Such a connection would be necessary if LEC network 103-1 could not directly reach SVD modem pool 115-1.

Thereafter, in the second stage, a destination indicator, e.g., a telephone number or data address, is supplied for each channel, voice or data, that is to be connected. It is noted that SVD modem 109-1 could be arranged so as to automatically dial the number of the SVD modem pool for the first stage—which is only required if no voice or data call is already in progress through the SVD modem—upon being supplied with the second stage destination indicator.

The destination indicator supplied during the second stage of dialing is forwarded to adjunct controller 117-1. Adjunct controllers 117 and network data base 133 to which they are connected, are described further below. In this example, adjunct controller 117-1 employs a destination indicator received via the SVD modem voice channel as the destination for routing the voice channel. Similarly, in this example, adjunct controller 117-1 employs a destination indicator received via the SVD modem data channel as the destination for routing the data channel.

For voice calls over the voice channel of an SVD modem, adjunct controller 117-1 a) routes the voice channel to circuit switched network 119 and b) supplies all the necessary signaling information so that circuit switched network 119 can further route the voice channel through IXC network 105 on its way to the destination supplied in the second stage of dialing. The routing of the voice channel through IXC network 105 is performed the same as for any ordinary voiceband telephone call. This is because the voice channel is placed into an ordinary POTS channel.

For data calls over the data channel of an SVD modem, adjunct controller 117-1 routes the data channel to packet network 121 and supplies all the necessary information so that packet network 121 can further route the data channel on its way to a destination supplied in the second stage of dialing. In particular, packet network 121 conveys packets containing the information of the data channel across its virtual circuits to the proper one of a) outbound modem pool 125, b) direct connect host 123 or 131, c) or an SVD modem pool 115. Outbound modem pool 125 contains several conventional data only modems, which allow a data channel to be connected to any device having a modem using a matching protocol, e.g., dial connect host 113. Direct connect host 123 is a computer system, having a direct packet network interface, for providing various services to a network subscriber from within the network of IXC 105. Similarly, direct connect host 131 is a computer system, having a direct packet network interface, for providing various services to network subscribers. However, direct connect host 131 is external to IXC network 105. For receiving calls, SVD modem pools 115 combine a received data channel with a voice channel, if any, and transmit the resulting combined signal to a called subscriber, e.g., through one of LEC networks 103.

In order to maximize the use of one's SVD modem, it is best that all incoming calls, whether originated from an SVD modem or not, be processed through an SVD modem pool 115. This is so that the called party may use the channel of his SVD modem that is not required for receipt of the incoming call. For example, a boss calls his telecommuting worker at home to request a particular piece of information that is stored in a data base remote from the worker's home. The worker has an SVD modem attached to his telephone line at home. If the boss' voice call is routed via an SVD modem pool 115, the call will only occupy the voice channel supplied by the employee's SVD modem. Thus, the data channel will remain free so that the employee may place a data call and connect to the remote data base to retrieve the necessary information while he continues to converse with his boss. However, if the boss' call had been routed directly to the employee and not through a modem pool 115, the call would occupy the entire POTS channel to the employee. As a result, the SVD modem would not be able to operate in a simultaneous voice/data mode and the employee would be unable to make the data call necessary to retrieve the information while continuing to talk to the boss. Instead, he would have to end the call with his boss, place a call to the remote data base and retrieve the information sought, then call his boss back to deliver the information.

Therefore, in an exemplary implementation, in order to process all calls to a called subscriber through an SVD modem pool 115 so as to maximize the use of the called subscriber's SVD modem, it is required that a two-stage address be supplied as the destination address for the called subscriber. The first stage address is that of the SVD modem pool 115 to which the called subscriber connects when he makes outgoing calls. The second stage address is an identifier that particularly identifies the called subscriber, e.g., his telephone line.

When a call arrives at one of SVD modem pools 115 from circuit switched network 119 or packet network 121, the particular modem pool having been determined by the first stage address supplied, the associated adjunct controller 117 receives the second stage address and determines whether or not a call using an SVD modem of its associated modem pool is already in progress with the called subscriber. If there is no call through an associated SVD modem already in progress with the called subscriber, adjunct controller 117 assigns the incoming call to an available SVD modem in its associated SVD modem pool 115. It also stores an indication as to which SVD modem the call is assigned. Controller 117 also supplies to the SVD modem the telephone number necessary to dial through LEC network 103 to reach the called subscriber.

If there already is a call in progress with the called subscriber through an SVD modem and the channel for carrying the incoming information is not in use, e.g., the incoming call is on the voice channel and only the subscriber's data channel is in use, or vice-versa, adjunct controller 117 assigns the incoming channel to the SVD modem in SVD modem pool 115 that is already assigned to the called subscriber. The information in the arriving channel is combined by the SVD modem with that of the channel already in use and the combined signal is supplied to the called subscriber through LEC network 103 over the already existing connection.

In another implementation, to maximize the availability of simultaneous voice and data service to a called subscriber, each SVD modem user is assigned a special translatable number, e.g., a 700 number. By virtue of the translation function, all calls placed to a subscriber's 700 number are automatically routed to a predetermined SVD modem pool 115. In addition, the translation function is augmented—which those skilled in the art know how to do—to provide an additional indicator of the telephone number of the line by which the subscriber's SVD modem is connected to network 103. When the call arrives at SVD modem pool 115 specified by the translation, adjunct controller 117 receives the additional indicator corresponding to the telephone number of the called subscriber's telephone line. The call is then connected, based on whether or not one of the channels is already in use, as described above. In the basic scenario, if the particular channel over which the call must be carried is in use, a busy indication is returned to the caller.

In yet another implementation, it is possible to dial the called subscriber's number directly and have the call automatically routed to SVD modem pool 115 when the called subscriber is already using one of the SVD channels. This is done by using the well-known overflow (transfer) on busy. Since the subscriber is already using one of the channels supplied by the SVD modem, his telephone line appears to LEC network 103 to be busy. In such a situation, a call placed directly to the subscriber's telephone line would ordinarily be blocked by LEC network 103 because the called subscriber is busy. However, if a) the subscriber has subscribed to overflow on busy and b) he has supplied the number of SVD modem pool 115 as the forwarding number, the incoming call will automatically be forwarded to SVD modem pool 115. The LEC supplies to adjunct controller 117 the originally dialed number as part of the overflow on busy feature. Adjunct controller 117 then determines the telephone line to which the call was originally placed and causes the incoming call to be connected to the SVD modem already in use by the called subscriber. The SVD modem then combines the incoming channel with the channel that was already in use by the called subscriber, provided that the presently incoming channel and the already in use channel are not the same type, i.e., not both data or not both voice. If the presently incoming channel and the already in use channel are the same, a busy indication is returned to the calling party.

It is also possible to reprogram the switches of the public switched telephone network so that all calls to the telephone numbers of particular users are routed through an adjunct controller 117 and modem pool 115 prior to being completed.

Figure 2:
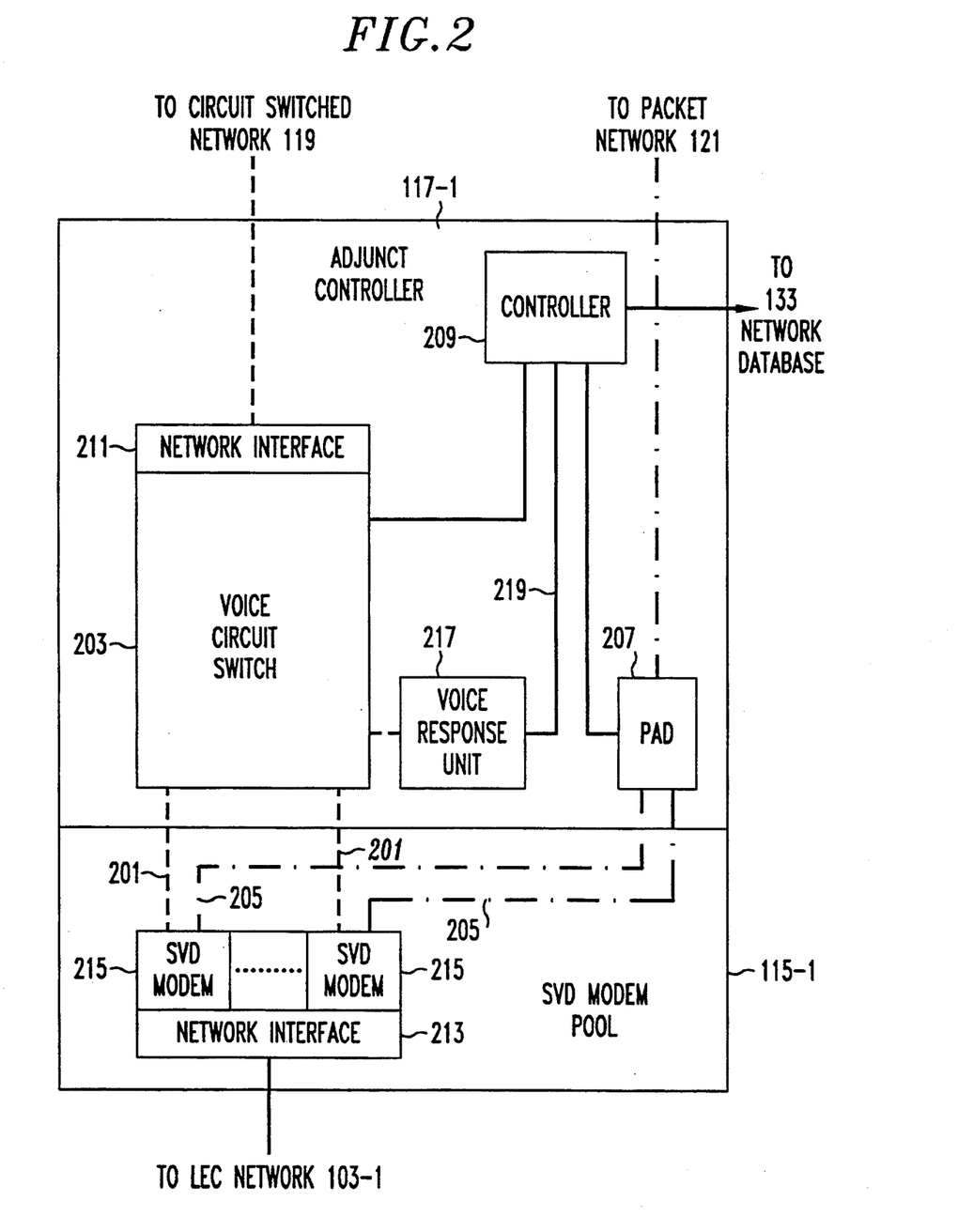
FIG. 2 shows an expanded view of an exemplary embodiment of an SVD modem pool and an adjunct controller of FIG. 1.

FIG. 2 shows an expanded view of an exemplary implementation of SVD modem pool 115-1 (FIG. 1) and adjunct controller 117-1. SVD modem pool 115-1 includes a plurality of SVD modems 215 (FIG. 2) and a common network interface 213. Network interface 213 is a channel bank that provides the multiplexing and demultiplexing of multiple POTS lines for communication with LEC network 103-1 (FIG. 1) over high-speed digital facilities. Network interface 213 (FIG. 2) provides a single POTS line to each SVD modem 215. SVD modems 215 perform the same functions as SVD modem 109 (FIG. 1).

The voice channel of each SVD modem 215 (FIG. 2) is communicated via links 201 to voice circuit switch 203. Voice circuit switch 203 is a conventional circuit switch, e.g., a PBX. Network interface 211 of voice circuit switch 203 multiplexes and demultiplexes the POTS channels switched by voice circuit switch 203 for communication with circuit switched network 119 over high-speed digital facilities. This connection also includes all the information necessary so that 1) outgoing calls may be routed through circuit switched network 119 and beyond and 2) incoming calls can be routed from SVD modem pool 115 to the called party, e.g., through a LEC network 103.

Voice response unit 217 is connected via voice channels to voice circuit switch 203. Voice response unit 217 is capable of independently processing each voice channel connected to it. Voice response unit 217 is also connected by control link 219 to controller 209. Control link 219 passes a) information obtained by voice response unit 217 from the channels connected thereto to controller 209 and b) indications of actions to be taken by voice response unit 217 from controller 209. In order to obtain information from the voice channels, voice response unit 217 contains dual tone multi-frequency (DTMF) signal decoders and/or speech recognition unites.

The data channel of each SVD modem 215 is communicated via links 205 to packet assembler/disassembler (PAD) 207. PAD 207 is an interface unit that receives data from an SVD modem and reformats the data as packets for transmission to packet network 121 (FIG. 1). PAD 207 (FIG. 2) also receives packets from packet network 121 and reformats the data in the packets into a form understandable by SVD modem 215. PAD 207 selects certain messages from the data stream of each channel and passes them to controller 209. Those of ordinary skill in the art will be able to readily design PAD 207.

Controller 209 is also connected to voice circuit switch 203, PAD 207, and network data base 133 (FIG. 1). Controller 209 (FIG. 2) is a general purpose computer for coordinating the operations of voice circuit switch 203, voice response unit 217, and PAD 207. It implements various functions including user login and authentication, coordination between voice and data channels, processing of user requests for various service options, and address translation to facilitate routing by circuit switched network 119 (FIG. 1) and packet network 121. These functions will be described further below in conjunction with FIGS. 4-5.

Those skilled in the art will recognize that some of the functionality of controller 209 may be distributed among voice circuit switch 203, voice response unit 217 and PAD 207.

Figure 3:
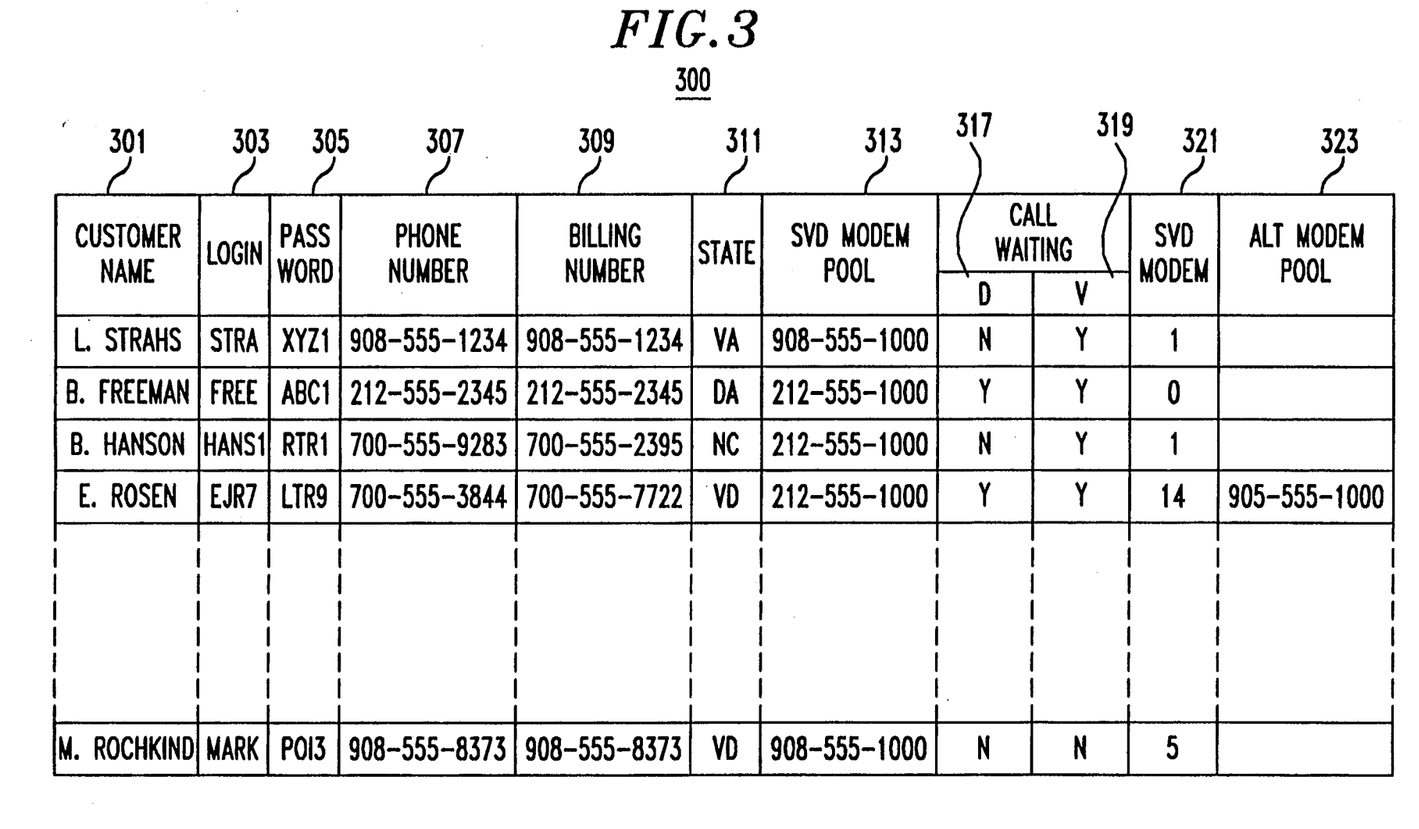
FIG. 3 shows an exemplary structure for the network data base shown in FIG. 1.

Each of adjunct controllers 117 is connected to network data base 133, which includes information about subscribers of the SVD service and their usage of the service. FIG. 3 shows exemplary data structure 300 for use in network data base 133 (FIG. 1). Shown on a row-by-row basis are values for the various fields for each customer. The fields include: a) customer name 301, b) login 303, c) password 305, d) phone number 307, e) billing number 309, f) state 311, g) SVD modem pool 313, h) data d) call waiting 317, i) voice (v) call waiting 319, and j) SVD modem 321, k) alternate (all) modem pool 323. As is well known in the art, additional fields may be defined as applications are developed in the future.

Customer name 301 holds the name of a subscriber to SVD service. The names shown in FIG. 3 have been shortened to allow the figure to fit on one page. Login 303 contains a login code selected by the subscriber while password 305 contains a secret password that may also be selected by the subscriber or may be assigned to him by the system. Phone number 307 contains the telephone number to which calls routed to the subscriber should be routed. This number is initially populated by the calling party number when the caller logs in, using a process described below, but may be changed to another telephone number in response to the subscriber's command. Billing number 309 is the telephone number to which SVD service usage should be billed. It need not be the same as phone number 307.

State 311 reflects the current usage of the SVD service by the subscriber. The values of the states includes: 1) VA—voice only active, 2) DA—data only active, 3) NC—not connected, and 4) VD—voice and data both active simultaneously. SVD modem pool 313 is the telephone number of the modem pool through which the subscriber usually places and receives calls using SVD service.

A "Y" in data (d) call waiting 317 indicates that the subscriber has activated the call waiting feature with notification over the data channel, which is discussed below. An "N" in data (d) call waiting 317 indicates that the subscriber has not activated the call waiting feature with notification over the data channel. Similarly, a "Y" in voice (v) call waiting 319 indicates that the subscriber has activated the call waiting feature with notification over the voice channel, as discussed below, while an "N" in voice (v) call waiting 319 indicates that the subscriber has not activated the call waiting feature with notification over the voice channel. SVD modem 321 indicates the particular one of the SVD modems 215 in an SVD modem pool 115 through which a subscriber has been assigned for a particular call. Alternate (alt) modem pool 323 indicates the telephone number of a particular SVD modem pool 115 to which the subscriber connected because the SVD modem pool whose number is listed in SVD modem pool 318 was unavailable, e.g., all the modems 215 in the SVD modem pool indicated by SVD modem pool 313 were in use or technical problems placed the entire modem pool out of service.

Figure 4:
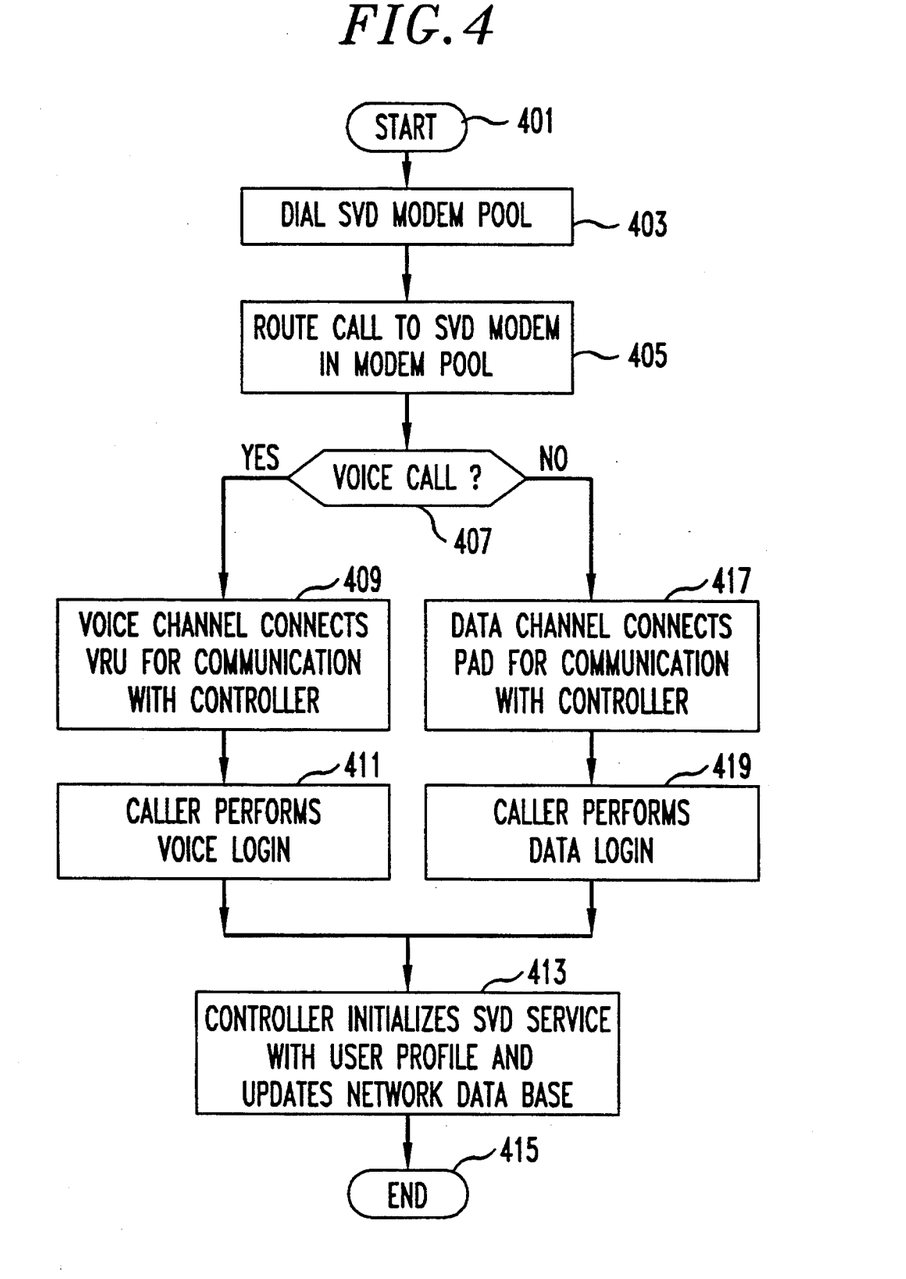
FIG. 4 shows an exemplary process for logging into an SVD modem.

In one embodiment of the invention, each caller using the network-based SVD modems is required to log in to SVD service for the purpose of identifying himself so that 1) his particular feature options can be activated and 2) he may be billed for his use of the SVD service. In particular, a caller can be billed for a) use of an SVD modem in the SVD modem pool, b) use of a voice connection, and c) transport of data packets. The caller may also be billed for the use of direct connect hosts 123 or 131 and dial connect host 113. FIG. 4 shows an exemplary process for logging into an SVD modem 215 of SVD modem pool 115. The process begins in step 401, when the caller initiates a voice or data call. This causes the caller's SVD modem, e.g., SVD modem 109-1, to go off hook on POTS subscriber line 106-1 and connect to LEC 103-I. Next in step 403, the caller dials the telephone number of SVD modem pool 115-1. The dialing may be performed either by conventional dialing at telephone 107-1 or by entering appropriate commands on data communications device 111-1 to instruct SVD modem 109-1 to perform the dialing. In step 405, the call is routed to an available one of SVD modems 215 in modem pool 115-1. Of course, if no SVD modems are available in the modem pool, a busy indication can be returned to the caller. The caller is then free to attempt to connect to a different one of modem pools 115. If he does so, the telephone number of this different modem pool 115 will be written into alternate (alt) modem pool 323 (FIG. 3) for the caller.

Control then passes to conditional branch point 407 (FIG. 4), which tests to determine if the caller is placing a voice call, e.g., was the dialing performed using telephone 107-1. If the test result in step 407 is YES, control passes to step 409, in which the voice channel of the SVD modem 215 to which the call was assigned is connected through voice circuit switch 203 to voice response unit 217, for communication with controller 209. Next, in step 411, the caller performs a voice log in, e.g., he identifies himself and supplies any necessary information to controller 209 over the voice channel. For example, this is done by supplying dual tone multi-frequency signaling from telephone 107-1 in response to prompts supplied from controller 209. Controller 209 may query network data base 133 for information necessary to confirm the identity of the caller, e.g., to retrieve the values of login 303 (FIG. 3) and password 305 for the caller, and to retrieve any information necessary to perform the log in, e.g., the prompt information. Control then passes to step 413 (FIG. 4), in which controller 209 initializes the SVD service by retrieving the caller's profile from network data base 133. Controller 209 also updates network data base 133 by writing in SVD modem 321 (FIG. 3) the particular SVD modem 215 to which the caller is connected. The process is then exited in step 415.

If the test result in step 407 is NO, indicating a data call is being placed, e.g., dialing was performed by data communications device 111-1, control passes to step 417, in which the data channel of the SVD modem 215 to which the call was assigned is connected, through PAD 207, to controller 209. In step 419, the caller performs a data login, e.g., he identifies himself to controller 209 by supplying over the data channel responses to queries from controller 209. For example, the responses are supplied by typing on the keyboard of data communications device 111-1. Again, controller 209 may query network data base 133 for information necessary to confirm the identity of the caller. Control then passes to step 413 and the process continues as described above.

At this point, the log in procedure is complete and the caller can access separate voice and data paths that can be used to connect, at the caller's choosing, his voice and data channels to any independent destinations. To direct each channel to a particular destination, the caller supplies a destination address—which may be a two-stage address as described above—to controller 209 over the particular channel to be connected.

Figure 5:
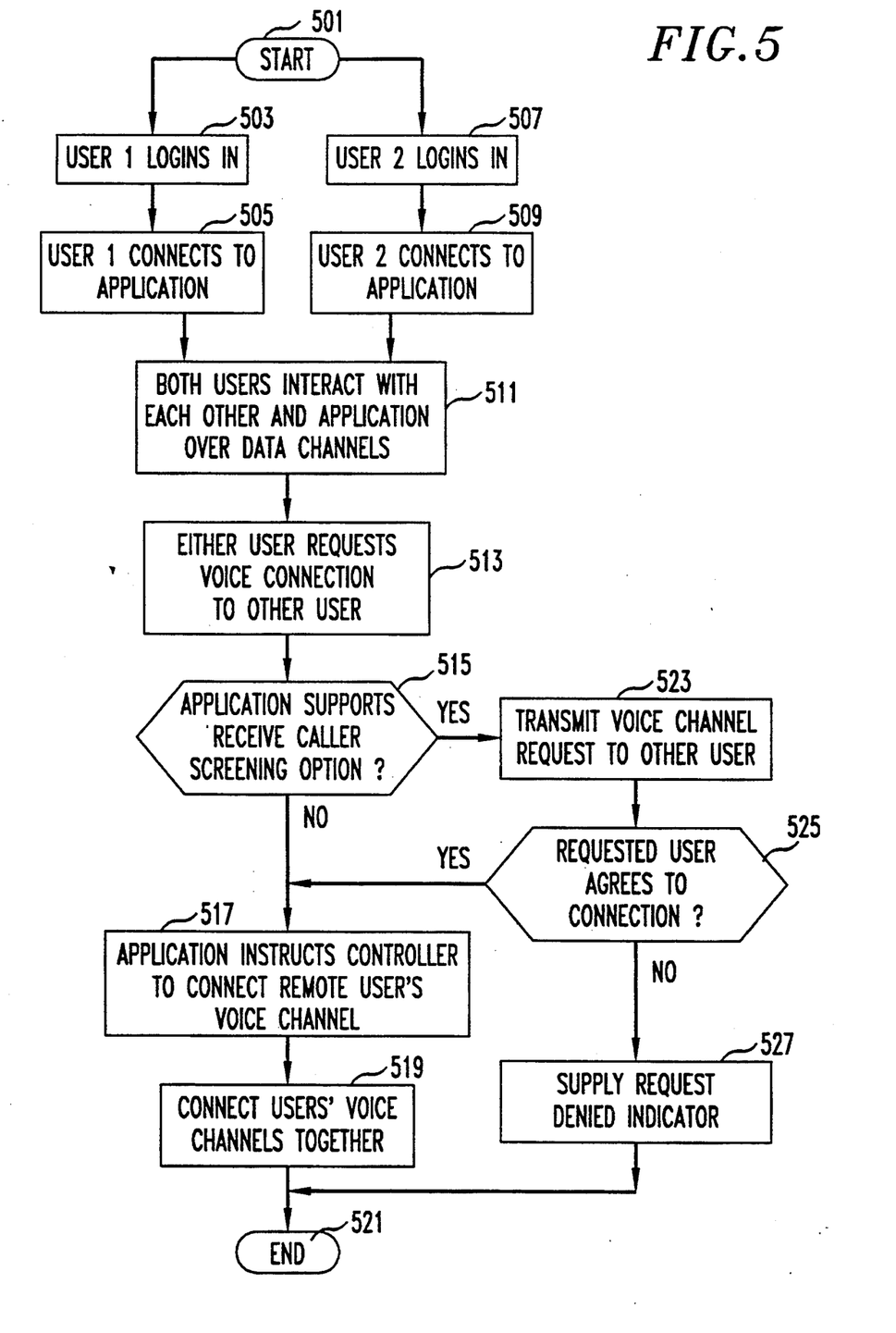
FIG. 5 shows an exemplary process by which two users who are using their data channels to engage in the same application and interact with each other can easily add communication with each other over their voice channels, in accordance with the principles of the invention.

FIG. 5 shows an exemplary process by which two users who are using their data channels to engage in the same application and interact with each other, e.g., they are playing a game, can easily and automatically add communication with each other over their voice channels, in accordance with the principles of the invention. Such a feature is called "voice assist" or, in the gaming context, "talk and play". The process begins in step 501, where each of two callers, herein "users" of the application, each initiates a call to an SVD modem 215 of one of SVD modem pools 115. Next, in step 503, user 1 logs in using the procedure shown in FIG. 4. Then, user 1 selects a particular application and connects thereto over the data channel in step 505. For example, user 1 selects an application running on direct connect host 123 and connects thereto over packet network 121. Similarly, in step 507, user 2 logs in using the procedure shown in FIG. 4 and, in step 509, connects to the same application that was selected by user 1.

In step 511, both users communicate and interact with each other and the selected application via their data channels. Next, in step 513, one of the users requests, through the application, a voice connection to the other user. Conditional branch point 515 tests to determine if the application supports a receive caller screening option. A receive caller screening option is a feature which allows the user to be called to accept or refuse the requested voice call even before it is routed through circuit switched network 119. This is important when the receiving of a call will cause the receiving user to incur additional charges. If the test result in step 515 is NO, indicating the receive caller screening option is not available, control passes to step 517.

In step 517, the application instructs the controller 209 of the adjunct controller 117 associated with the SVD modem pool through which the requesting user is connected to establish a voice connection through circuit switched network 119, in accordance with an aspect of the invention. An exemplary way to do this is for the application to insert into the data stream a message that is selected by PAD 207 for transmission to controller 209. The connection requested is from the requesting users' SVD modem 215 to the requested users' SVD modem 215. To this end, the controller 209 associated with the requester uses information in network data base 133, e.g., SVD modem pool 313 (FIG. 3) and SVD modem 315, to determine the SVD modem 215 to which the requested user is connected. Next, in step 519, the users' voice channels are connected together. Each user is appropriately alerted to the existence of the voice connection. The process then exits to step 521.

If the test result in step 515 is YES, indicating that this application supports the received caller's screening option, control passes to step 523, in which a voice channel request is transmitted over the data channel from the application to the requested user, in accordance with an aspect of the invention. Conditional branch point 525 then tests to determine if the requested user agrees to the establishing of a voice connection between himself and the requesting user. Such agreement is signaled by the requested user transmitting a special message over the data channel. If the test result in step 525 is NO, control passes to step 527, in which the application supplies a request denied indicator to the requesting user over the data channel. A voice connection is not established and control passes to step 521 at which the process is exited. If the test result in step 525 is YES, indicating the requested user agrees to a voice connection with the requesting user, control passes to step 517 and the process continues as described above.

It is noted that the foregoing procedure may be extended to more than two users. In such a case, the voice channel of each user would be connected to a common conference bridge.

In accordance with another aspect of the invention, a user who is employing one of SVD modems 205 for interacting with an application, e.g., a program running on direct connect hosts 123 or 131, over a data channel connection, the application having multiple contexts in each of which, for example, different commands, features, functions, information, or services may be provided, has a second connection carrying the voice channel automatically established, at his request, to a particular person, the particular person being determined as function of the context in which the application is being used by the user at the time his request is made.

Figure 6:
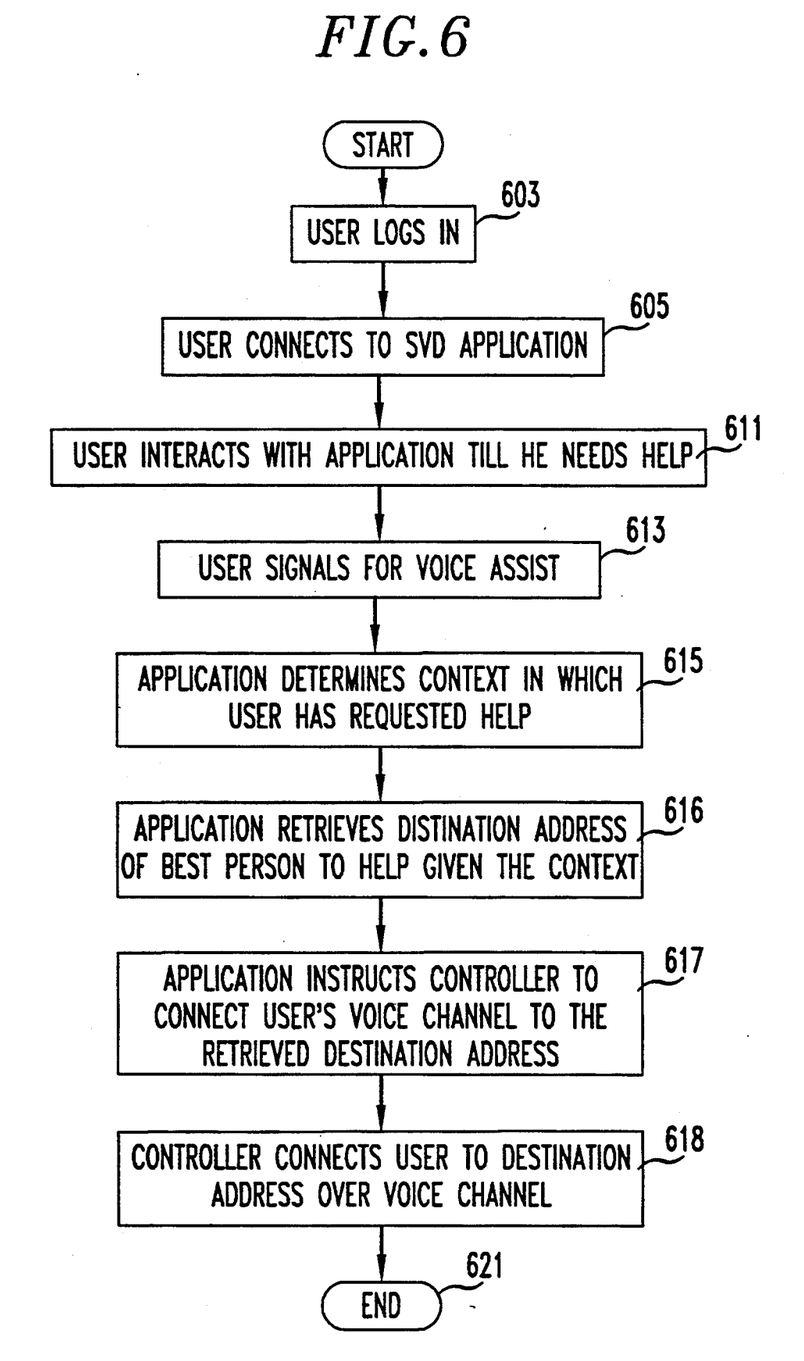
FIG. 6 shows an exemplary process by which, in accordance with the principles of the invention, a user who is using his data channel to engage in an application, can easily and automatically add voice communication over the voice channel with the best person to help him, should he need help, based on the context in which the user finds that he needs such help.

FIG. 6 shows an exemplary process by which, in accordance with the principles of the invention, a user who is using his data channel to engage in an application, such as an on-line home shopping system, can easily and automatically add voice communication over the voice channel with the best person to help him, should he need help, based on the context in which the user finds that he needs such help. Such a feature is called "context-sensitive voice assist". The process begins in step 601, where a user of the application initiates a call to an SVD modem 215 of one of SVD modem pools 115. Next, in step 603, the user logs in using the procedure shown in FIG. 4. Then, the user selects a particular application and connects thereto over the data channel in step 605. For example, the user selects an application running on direct connect host 123 and connects thereto over packet network 121.

In step 611, the user communicates and interacts with the selected application, via his data channel, until he encounters something in the application for which he needs help. For example, an application running on direct connect host 123 is a so-called "on-line home shopping system". The user, who is considering buying a particular product, decides to review an extended warranty that is available for that product. The phraseology of the warranty, however, is such that the user, by simply reading it, cannot clearly discern what is covered by the warranty. Therefore, in step 613, the user requests help, through the application, by signaling for voice assist. This is done by the user entering a command, e.g., by typing on his keyboard or by clicking his mouse over a predefined on-screen "button", indicating that assistance by a live representative is required.

Next, in step 615, the on-line home shopping system recognizes the command and, determines the context, i.e., the activity of the application that the user is currently engaged in, in which the help was sought. The context can be determined using the same, well known, techniques that are employed for context-sensitive on-line help systems. The application then retrieves the destination address, e.g., telephone number, of the best person to help the user, given the context of his help request. This can be done by using a look-up table that stores the destination addresses indexed by values representing the possible contexts. Since the context of the example is the viewing a particular product's extended warranty, the application determines that the best person for the user to speak with is a representative of the company supplying the warranty, and it retrieves a telephone number for the company's representative.

In step 617, the application instructs controller 209 of the adjunct controller 117 associated with the SVD modem pool through which the requesting user is connected to establish a voice connection through circuit switched network 119 to the retrieved destination address, in accordance with an aspect of the invention. An exemplary way to do this is for the application to insert into the data stream a message that is selected by PAD 207 for transmission to controller 209. The connection requested is from the requesting users' SVD modem 215 to the retrieved destination address. Next, in step 619, the user's voice channel is connected to the destination address over the voice channel. The user is also alerted to the existence of the voice connection. The process then exits to step 621.

Other exemplary situations in which the "context-sensitive voice assist" feature would be especially useful are: a) information retrieval using an on-line data base, to connect to a subject matter expert; b) on-line shopping, to connect to a sales person with knowledge of particular merchandise in which the shopper is interested; c) engaging in financial transactions, to connect to a financial advisor; d) making travel plans, to connect to a travel agent who is an expert on the subject of the intended destination; and e) using a particular piece of software, to connect to customer support for that software.

A similar "context-sensitive data assist" feature may also be implemented, by which a data connection is automatically established to a user who is interacting with an application over his voice channel.

In another embodiment of the invention, a login procedure is not necessary to access an SVD modem in an SVD modem pool. Instead, dialing a special code, e.g., 1-0-ATT-#3, will automatically connect a caller to an appropriate SVD modem in the public switched network.

It is noted that a public switched telephone network includes any communications network generally available for public use including, without limitation, the networks of LECs, IXCs, mobile telephone service providers, and cable companies. It is also noted that packet switched networks include any type of network providing packet service, including frame relay and asynchronous transfer mode (ATM).

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in providing a connection between a plurality of users, each of said users employing a simultaneous voice and data (SVD) modem provisioned in a public switched network for interacting with each other over a first connection between said SVD modems, said connection carrying a first one of the two SVD modem channels, the method comprising the step of:

automatically establishing a second connection between said SVD modems in said public switched network, said second connection carrying the second one of said SVD modem channels and being independent of the path of said first connection.

2. The invention as defined in claim 1 wherein said establishing step is performed in response to a request by one of said users.

3. The invention as defined in claim 2 wherein said establishing step further includes the steps of:

using stored information for identifying which of said SVD modems in said network said users, other than said requesting user, are employing; and
   connecting a path, for carrying said second channel, between said identified SVD modems and the SVD modem to which said requesting user is connected.

4. The invention as defined in claim 3 wherein said path for carrying said second channel includes a conference bridge.

5. The invention as defined in claim 3 wherein said path for carrying said second channel includes a common data application.

6. The invention as defined in claim 1 further comprising the step of:

storing information for identifying which of said SVD modems in said network said users are employing;
   and wherein said establishing step further includes the steps of:
   identifying which SVD modems in said network are employed by said users in response to said stored information; and
   connecting a path for carrying said second of said SVD channels between said identified SVD modems.

7. The invention as defined in claim 1 wherein said first connection includes a common data application and said second connection is a direct voice channel connection.

8. A method for use in providing a connection between a plurality of users, each of said users employing a simultaneous voice and data (SVD) modem provisioned in a public switched network for interacting with each other over a first connection between said SVD modems, said connection carrying a first one of the two SVD modern channels, the method comprising the step of:
  automatically establishing a second connection between said SVD modems in said public switched network, said second connection carrying the second one of said SVD modern channels, and being independent of the path of said first connection;
  wherein said first connection is via a packet switched network and said second connection is via a circuit switched connection.

9. A method for use in providing a voice connection between a plurality of users that are each connected to a common data application via respective simultaneous voice and data (SVD) modems, the method comprising the steps of:
  separately routing the data channels supplied from each of said SVD modems of each of said users to a common data application, said routing being independent of the voice channels of said SVD modems; and
  connecting the voice channels of ones of said SVD modems in response to a command from said data application.

10. The invention as defined in claim 9 wherein said voice connection is established via a conference bridge.

11. The invention as defined in claim 9 wherein said routing step includes the step of:
  logging into an SVD modem provided by said public switched network.

12. The invention as defined in claim 9 further comprising the step of:
  receiving at said application a request, supplied over the data channel of a particular user's SVD modem, to establish said connection between the voice channels.

13. The invention as defined in claim 12 further comprising the step of:
  transmitting from said application to a user other than said particular user a request for permission to establish said connection between the voice channels;
  and wherein said establishing step is performed only if an affirmative response is received from said other user.

14. A method for use in connecting a plurality of users of a common data application, each of said users being connected to said common data application over a connection that passes through a public switched network and includes (i) a first simultaneous voice and data (SVD) modem connected to the user's telephone line for supplying an output having a combined voice and data channel, (ii) a second SVD modem in said public switched network for separating the combined voice and data channel from said first SVD modem into separate voice and data channels, said data channel being connected to said common application, the method comprising the step of:
  connecting together said separate voice channels of each of said plurality of users in said public switched network in response to a command received from said common application, the resulting connection existing independent of said common application, whereby said users can talk to each other over said connected voice channels.

15. The invention as defined in claim 14 wherein the resulting connection is established via a conference bridge.

16. A method for use in connecting a plurality of users of a common data application, each of said users being connected to said common data application over a connection that passes through a public switched network and includes (i) a first simultaneous voice and data (SVD) modem connected to the user's telephone line for supplying an output having a combined voice and data channel, (ii) a second SVD modem in said public switched network for separating the combined voice and data channel from said first SVD modem into separate voice and data channels, said data channel being connected to said common application, the method comprising the step of:
  connecting together said separate voice channels of each of said plurality of users in said public switched network in response to a command received from said common application, the resulting connection existing independent of said common application, whereby said users can talk to each other over said connected voice channels; and
  wherein the resulting connection is established via a circuit switched connection.

17. A method for use in a public switched telephone network having a first simultaneous voice and data (SVD) modem to which a first user has connected a first user SVD modem and a second SVD modem to which a second user has connected a second user SVD modem, a first connection existing between said first and second SVD modems in said public switched network for carrying one of the two SVD modem channels, the method comprising the step of:
  automatically establishing a second connection between said first and second SVD modems of said public switched network, said second connection carrying the other of said two SVD modem channels.

18. A method for use in providing a connection between a user who is employing a simultaneous voice and data (SVD) modem provisioned in a public switched network for interacting with an application over a first connection between said SVD modem and said application, said connection carrying a first one of the two SVD modem channels, said application having a plurality of different contexts in which said user can interact with said application, said user interaction always being within at least one of said contexts, the method comprising the step of:
  automatically establishing a second connection from said user using the second of said SVD modem channels, said second connection being placed to a particular person via said SVD modem in said public switched network and said particular person being selected as a function of the context in which said user is interacting with said application.

19. A method for use in providing a connection between a user who is employing a simultaneous voice and data (SVD) modem provisioned in a public switched network for interacting with an application over a first connection between said SVD modem and said application, said connection carrying a first one of the two SVD modem channels, said application having a plurality of different contexts in which said user can interact with said application, said user interaction always being within at least one of said contexts, said SVD modem being associated with an adjunct for controlling and coordinating the routing of said SVD modem channels, the method comprising the steps of:

determining a destination to which a second connection is to be connected, said determining being responsive to the particular context in which said user is interacting with said application;

transmitting a message to said adjunct over said first connection instructing said adjunct to establish a connection between said user and said determined destination using the second SVD modem channel.

20. The invention as defined in claim 19 further including the step of connecting the second SVD modem channel of said user to said determined destination.

21. A method for use in providing a connection between a plurality of users, each of said users employing a simultaneous voice and data (SVD) modem provisioned in a public switched network for interacting with each other over a first connection between said SVD modems, said connection carrying a first one of the two SVD modem channels, the method comprising the step of:

establishing a second connection between said SVD modems in said public switched network, said second connection carrying the second one of said SVD modem channels and being independent of the path of said first connection;

said establishing step being characterized in that no destination address is supplied by the one of said users requesting said second connection.

22. A method for use in providing a connection between a plurality of users, each of said users employing a simultaneous voice and data (SVD) modem provisioned in a public switched network for interacting with each other over a first connection between said SVD modems, said connection carrying a first one of the two SVD modem channels, the method comprising the step of:

establishing a second connection between said SVD modems in said public switched network, said second connection carrying the second one of said SVD modem channels and being independent of the path of said first connection, said establishing being performed without requiring any dialing by any of said users.

23. A method for use in providing a connection between a user who is employing a simultaneous voice and data (SVD) modem provisioned in a public switched network for interacting with an application over a first connection between said SVD modem and said application, said connection carrying a first one of the two SVD modem channels, said application having a plurality of different contexts in which said user can interact with said application, said user interaction always being within at least one of said contexts, the method comprising the step of:

establishing a second connection from said user using the second of said SVD modem channels, said second connection being placed to a particular person via said SVD modem in said public switched network and said particular person being selected as a function of the context in which said user is interacting with said application, said establishing being performed without requiring any destination address to be supplied by said user.

* * * * *